(12) United States Patent
Loeb et al.

(10) Patent No.: US 6,421,652 B2
(45) Date of Patent: *Jul. 16, 2002

(54) METHOD AND SYSTEM FOR QUALIFYING CONSUMERS FOR TRADE PUBLICATION SUBSCRIPTIONS

(75) Inventors: Michael Loeb, Darien; Michael Borchetta, Stamford, both of CT (US)

(73) Assignee: Synapse Group Inc., Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/361,424

(22) Filed: Jul. 27, 1999

(51) Int. Cl.[7] .............................................. G06H 17/60
(52) U.S. Cl. .............................. 705/14; 705/10; 705/26; 705/1
(58) Field of Search .............................. 705/14, 16, 10, 705/26, 1, 500

(56) References Cited

U.S. PATENT DOCUMENTS 5,926,796 A * 7/1999 Walker et al. ................ 705/16
6,014,641 A * 1/2000 Loeb et al. ................... 705/34
6,018,718 A * 1/2000 Walker et al. ................ 705/14

FOREIGN PATENT DOCUMENTS

| JP | 359118319 A | * | 7/1984 | ........... B23Q/3/155 |
| WO | WO 9933012 | * | 7/1999 | ........... G06F/17/60 |

OTHER PUBLICATIONS

'CyberGold Delivers the Digital Elite to NewMedia Magazine', PR Newswire, p721SFM031, Jul. 1997.*

'freebizmag.com Advertises on bpai.com; Online Collector of Business Publication Qualifiers Becomes BPA's First Contract Advertiser', Business Wire, pp. 243, Aug. 2000.* http://www.frebizmag.com/welcome.asp?FBMVisitId= 22443110, 2000.*

* cited by examiner

*Primary Examiner*—Kyle J. Choi
*Assistant Examiner*—Akiba Robinson-Boyce

(57) ABSTRACT

A method and system for providing free subscriptions to magazines, based on a universal questionnaire. Questions of the universal questionnaire are presented to consumers, and, based on the consumer response to these questions, a supplier order for a free subscription to a magazine is generated and sent to a supplier of the magazine.

24 Claims, 17 Drawing Sheets

Fig. 4

Consumer Database 354

| Consumer ID | Consumer Name and Address | Consumer Profession | Consumer Title | Consumer Field of Specialty | Qualification Date | Magazine ID | Personal Identifier |
|---|---|---|---|---|---|---|---|
| 071168 | T. Maginnis 45 Sutton Place NY, NY 10023 tmagin@yahoo.com | Engineer | Research Engineer | Computer Software | 7/15/99 | 112773 995568 102091 | Mother's Maiden Name = Porzio |
| | | | | | | | |
| | | | | | | | |
| | | | | | | | |
| | | | | | | | |

Fig. 5

Magazine Database 356

| Magazine ID | Magazine Name | Publisher ID | Fulfillment House ID | Internal Counter | Internal Counter Limit | Publisher Charge (New Subscription) | Publisher Charge (Renewal) |
|---|---|---|---|---|---|---|---|
| 112773 | Engineering News | 012678 | 021935 | 711 | 1000 | $5 | $1.25 |
| | | | | | | | |
| | | | | | | | |
| | | | | | | | |

Fig. 6

Publisher Database 358

| Publisher ID | Publisher Name | Publisher Information (contact, address, phone) | List of Magazine IDs Published |
|---|---|---|---|
| 012678 | Time, Inc. | Gerard A. Haddad<br>345 Park Avenue<br>NY, NY 10154 | 112773<br>120965<br>100843 |
|  |  |  |  |
|  |  |  |  |
|  |  |  |  |

Fig. 7

Fulfillment House Database 359

| Fulfillment House ID | Fulfillment House Name | Fulfillment House Information (contact, address, phone, etc.) | List of Magazine ID's Provided |
|---|---|---|---|
| 021935 | CDS | Rich Erwine<br>345 Park Avenue<br>NY, NY 10154 | 112773<br>120965<br>100843<br>090296 |
|  |  |  |  |
|  |  |  |  |

Consumer Sign Up

Fig. 9

Example of questions being brought down to lowest common denominator:

Magazine A
*What is your company's annual gross sales?*

A  Over $300 million
B  $200 million to under $300 million
C  $100 million to under $200 million
D  $50 million to under $100 million
E  $5 million to under $50 million
F  Under $5 million

Magazine B
*What are your organization's gross sales yearly?*

G  Over $250 million
H  $150 million to under $250 million
I  $100 million to under $150 million
J  $50 million to under $100 million
K  $25 million to under $50 million
L  $10 million to under $25 million
M  $5 million to under $10 million
N  $1 million to under $5 million
O  Under $1 million

Magazine C
*How much revenue does your company generate each year?*

P  Over $500 million
Q  $100 million to under $500 million
R  $25 million to under $100 million
S  $5 million to under $25 million
T  $1 million to under $5 million
U  Under $1 million

Universal Questionnaire
*What is your organization's annual gross sales?*

1  Over $500 million
2  $300 million to under $500 million
3  $250 million to under $300 million
4  $200 million to under $250 million
5  $150 million to under $200 million
6  $100 million to under $150 million
7  $50 million to under $100 million
8  $25 million to under $50 million
9  $10 million to under $25 million
10 $6 million to under $10 million
11 $1 million to under $5 million
12 Under $1 million Example of universal questionnaire answers translated back To publishers answers:

*What is your organization's annual gross sales?*

1  Over $500 million
2  $300 million to under $500 million
3  $250 million to under $300 million
4  $200 million to under $250 million
5  $150 million to under $200 million
6  $100 million to under $150 million
7  $50 million to under $100 million
8  $25 million to under $50 million
9  $10 million to under $25 million
10 $5 million to under $10 million
11 $1 million to under $5 million
12 Under $1 million

*Answers to Universal Questionnaire*

☐ ☐ ☐ ☐ ☐ ☐ ☐ ☐ ☒ ☐ ☐ ☐

*Answers to Individual Magazine Questionnaire*

E  Magazine A
L  Magazine B
S  Magazine C

Receive Consumer Information In Response...
(Step 820)

Fig. 11A
Specific Example of Step 820
From Step 810

Receive initial response from consumer (either by link or consumer contact)
1110

Transmit question:
"What is your profession?"
1115

Receive answer:
"Engineer"
1120

Transmit question based on previous answer:
"As an Engineer, your title is?"
1125

Receive answer:
"Research Engineer"
1130

Transmit question based on previous answer:
"As a Research Engineer, your field of specialty is?"
1135

Receive answer:
"Computer Software"
1140

Based on answers, consumer qualifies for Magazines X, Y, and Z
1145

To step 830

"Tree Logic" of the Universal Questionnaire

Fig. 11C

Example of Universal Questionnaire $Q_1$: "What is your profession?"

$A_1$: [X]$_A$ [ ]$_B$ [ ]$_C$ [ ]$_D$ [ ]$_E$ [ ]$_F$ [ ]$_G$ [ ]$_H$

A = Engineer
B = Management
C = Lawyer
   etc.

(If $A_1$ = A , then ... $Q_2$)

$Q_2$: "As an Engineer, your title is?"

$A_2$: [X]$_A$ [ ]$_B$ [ ]$_C$ [ ]$_D$

A = Research
B = Application
C = Sales
   etc.

(If $A_2$ = A, then ... $Q_5$)

$Q_5$: "As a Research Engineer, your field of specialty is?"

$A_5$: [X]$_A$ [ ]$_B$ [ ]$_C$

A = Computer Software
B = Computer Hardware
C = Bio-medical

If $A_1$ = A and $A_2$ = A and $A_5$ = A then consumer qualifies for magazines X, Y and Z.

Automatic Annual Re-Qualification

Automatic Re-Qualification Based on Address Change

METHOD AND SYSTEM FOR QUALIFYING CONSUMERS FOR TRADE PUBLICATION SUBSCRIPTIONS

BACKGROUND OF THE INVENTION

1. Field of the Invention

The present invention relates generally to trade publication subscriptions. More specifically, the invention relates to a method and apparatus for providing trade publication subscriptions to consumers based on answers provided by consumers to a universal questionnaire.

2. Description of the Related Art

The magazine industry categorizes publications into two groups: consumer titles and trade publications. Consumer magazines are titles the public is commonly familiar with, such as National Geographic, Time, Good Housekeeping and Reader's Digest. Trade publications, on the other hand, are primarily intended for professionals and go by names like "Catalog Age", "Circulation Management", and "Professional Jeweler". For every profession or trade association there is almost invariably a trade publication, or more likely several, about the job, the work, or the industry. Trade publications are also called controlled, business or professional publications.

Trade publications differ from consumer magazines in many ways. For example, circulation sizes of trade publications are extremely small compared to that of consumer magazines. For instance, the typical trade publication has a circulation between 20,000 and 50,000 subscribers, as compared to over one million subscribers for many consumer magazines. Also, total trade publication subscriptions number approximately 81 million (divided among 3000 titles), as compared to the 300 million consumer magazines now in circulation.

Trade publication subscription qualification is governed primarily by the BPA. For instance, a consumer must qualify for a trade publication at least once for every 12-month period. That period may be arbitrary, or standard, such as from June 30 of year 1 to June 30 of year 2.

Consumer titles generate revenue from two constituencies, the consumer and the advertiser. Revenue from the consumer is based on subscription fees and newsstand sales. Trade publications, on the other hand, make virtually no revenue from the consumer, i.e., from subscriptions and newsstand sales. Instead, trade magazines make virtually all their revenue from advertising within their pages. Advertisers are willing to pay high fees because trade publications penetrate a very specific and valuable target audience. Advertisers view trade publications as a valuable resource because each trade publication targets a particular audience. Thus, publishers of trade publications are able to give away subscriptions because advertisers are willing to pay high fees to advertise within their pages. However, publishers of these trade publications only give away subscriptions to qualified readers/consumers.

Qualified consumers are determined in the following manner. First, publishers of trade publications must rent expensive lists identifying their target audience. After identification, the typical method of acquisition is direct mail, costing about 40 cents for each individual contacted (in the metric of the industry or $400 per thousand). The direct mailing includes a questionnaire with specific questions generated by the publisher. Based on the consumer's answers to the questionnaire, the consumer may qualify for a free trade publication. However, very few of the targeted audience who receive the questionnaire typically fill it out and return it to publishers. For instance, the mail response rates average between 5% and 10%. Thus, the cost of acquisition for a free subscription to a trade publication is generally between $5 and $10, and sometimes much more.

Therefore, a need exists for an improved method and system that qualifies consumers for subscriptions to trade publications.

Consumer magazine publishers pursue consumers and subscriptions in very different ways from trade publication publishers. For instance, in the consumer environment, 60% of all new subscriptions are acquired by third-party service providers known as agents. Agents enjoy a superior economic model because they acquire subscriptions for dozens of magazines simultaneously. Thus, agents can pass on acquisition costs to multiple publishers. The agency model has no parallel in the trade publication universe.

Thus, a need exists for an improved method and system for qualifying consumers to receive subscriptions to trade publications, particularly a method and system that allows an agent to pass on acquisition costs to multiple publishers.

SUMMARY OF THE INVENTION

The present invention is directed to a method and apparatus that substantially obviates one or more of the problems due to limitations, shortcomings, and disadvantages of the related art.

One advantage of the invention is that it markets trade publications to a large, unsegmented population as opposed to a specific and limited target.

Another advantage is the universal questionnaire that incorporates thousands of questions from several publishers into an efficient series of questions that require potential subscribers to answer consumer-relevant questions only.

A further advantage is the re-qualification process that continually updates the profiles of subscribers prior to magazine renewal.

To satisfy these and other needs, one aspect of the invention includes a system for providing free trade publication subscriptions, based on a universal questionnaire. The software that implements the questionnaire determines certain trade publications that apply to each consumer, and allows the consumer to choose the trade publications he would like to receive.

In another aspect, the invention includes a system for providing renewal subscriptions based on a re-qualification process. This process is initiated at some point prior to the expiration of a subscription, or upon receipt of an address change from the subscriber. A re-qualification questionnaire is sent to determine if any consumer information has changed and if the consumer is entitled to renewals or new subscriptions.

Additional aspects of the invention are disclosed and defined by the appended claims. It is to be understood that both the foregoing general description and the following detailed description are exemplary and explanatory and are intended to provide further explanation of the invention as claimed.

BRIEF DESCRIPTION OF THE DRAWINGS

The accompanying drawings illustrate one embodiment of the invention. The drawings are incorporated in and constitute a part of this specification.

FIG. 4 illustrates a sample of the contents of the consumer database stored in the central controller shown in FIGS. 2–3;

FIG. 5 illustrates a sample of the contents of the magazine database stored in the central controller shown in FIGS. 2–3;

FIG. 6 illustrates a sample of the contents of the publisher database stored in the central controller shown in FIGS. 2–3;

FIG. 7 illustrates a sample of the contents of the fulfillment house database stored in the central controller shown in FIGS. 2–3;

FIG. 9 illustrates a normalization process executed by the system shown in FIG. 1;

FIG. 11A illustrates an example of the new subscription process illustrated in FIG. 8;

FIG. 11C illustrates an example of the new subscription process illustrated in FIG. 8;

DETAILED DESCRIPTION OF PREFERRED EMBODIMENTS

Introduction

The method and system according to one embodiment of the invention satisfies the shortcomings of the existing methods and systems for soliciting subscribers by providing a universal questionnaire to a large, potentially untargeted audience, as opposed to mailing individual questionnaires to targeted groups of potential subscribers. The method and system determines what trade publication(s) each consumer may receive. All information associated with a particular consumer is stored in a database and publishers/fulfillment houses are notified to initiate appropriate subscriptions for each consumer. Publishers who previously attempted to solicit individual subscribers with questionnaires are instead billed a fee, that is less than the cost of acquiring consumers with individual questionnaires, for each subscription provided by the present embodiment.

System Of The Invention

Figure 1:
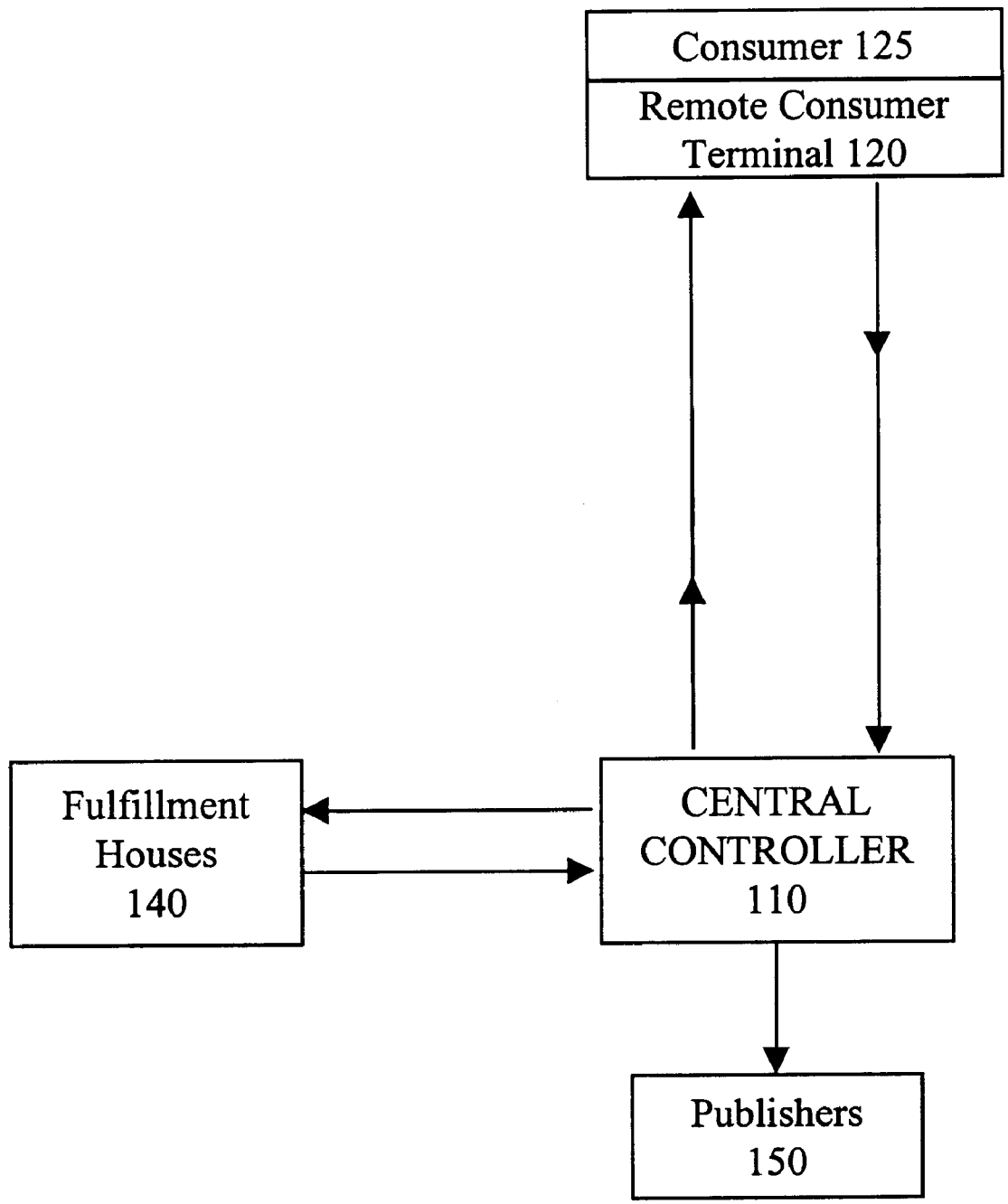
FIG. 1 illustrates a system according to one embodiment of the present invention.

FIG. 1 shows one embodiment of the system of the present invention. In this embodiment, the system includes a central controller 110, configured to receive information from consumers 125 at remote consumer terminals 120, and transmit data to fulfillment houses 140 and magazine publishers 150.

Central controller 110 preferably comprises a processor-based system that maintains databases and information relating to trade publication subscriptions. Central controller 110 provides the universal questionnaire to consumers 125 at remote consumer terminals 120 (i.e., consumer's PC, internet access device, telephone, . . . ). Central controller 110 stores information received from consumers 125 in consumer database 354. Based on the answers received from consumer 125, central controller 110 determines what trade publications consumer 125 is entitled to, notifies consumer 125 of such and also transmits data to fulfillment house 140, requesting fulfillment house 140 to prepare the appropriate subscriptions for each consumer. Also, the central controller 110 transmits consumer and subscription information to fulfillment house(s) 140. Each publisher 150 is charged a certain fee based on the trade publication(s) selected, and the number of subscriptions provided. The structure of certain embodiments of the central controller 110 is described below in connection with FIGS. 2 and 3.

Consumers 125 include individuals wishing to receive free subscriptions to trade publications. In one embodiment, consumers 125 initiate their interest and provide subscription information to the central controller 110 through remote consumer terminals 120. In one embodiment, the remote consumer terminal 120 can be the consumer's PC or internet access device. In another embodiment, the remote consumer terminal 120 is a telephone. Consumers 125 can transmit this subscription information in various ways. For instance, consumers can provide subscription information electronically by means of the internet. This is done by transmitting subscription orders electronically from the remote consumer terminal 120 to the central controller 110, which provides a consumer interface in the form of a web page on the internet. Two alternate ways for consumer 125 to transmit subscription information to central controller 110 include (1) telephoning live operators at central controller 110, to verbally provide answers which are entered into the system via operator terminals; and (2) telephone answering services at central controller 110 that provide programmed responses based on answers received from each consumer.

Fulfillment houses 140 receive all consumer information and provide each subscription to appropriate consumers. Each fulfillment house 140 controls at least one trade publication and possibly several more based on its relationship with respective publishers 150. In one embodiment central controller 110 transmits consumer information and subscription requests to fulfillment house(s) 140 electronically by means of the internet. Fulfillment house(s) 140 may be notified to either initiate, renew or cancel subscriptions for each consumer 125.

Publishers 150 publish trade publications and provide them to subscribers through fulfillment houses 140. Publishers 150 are billed a fee for each new subscription provided to a consumer 125. Also, publishers 150 may be billed a smaller fee for each renewal subscription provided to a consumer 125.

Figure 2:
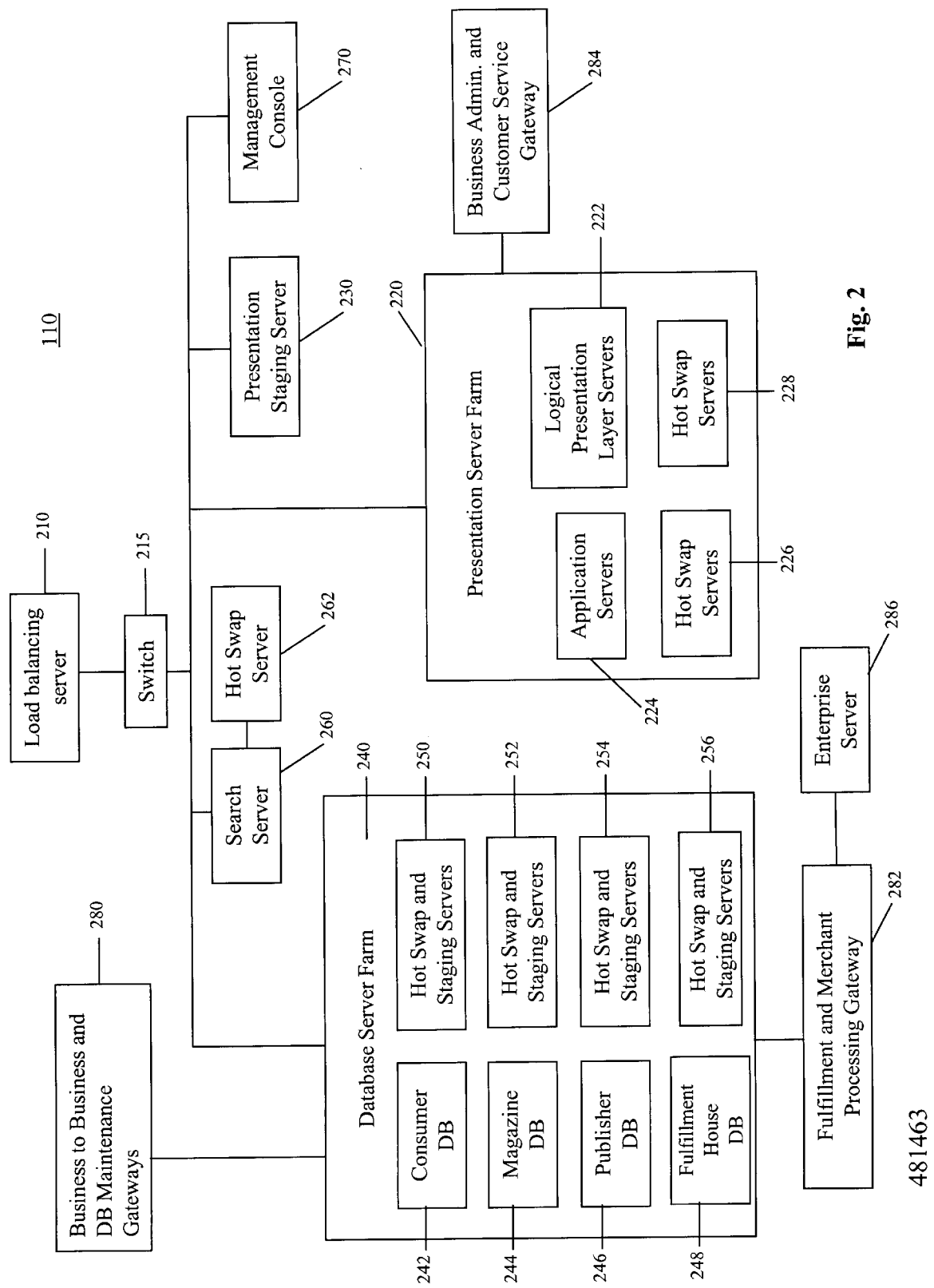
FIG. 2 illustrates one embodiment of the central controller used in the system shown in FIG. 1.

A detailed schematic of the central controller 110 will now be described with reference to FIG. 2. In general, the central controller 110 comprises a three tier or layered structure. The first layer is a logical presentation layer, which provides the graphically user interface (GUI) through which each consumer 125 interfaces with the central controller 110. The second layer is the application layer, which provides support logic for the GUI and establishes the business rules. The third layer is the database management layer, which interacts with the application layer to retrieve, modify, and store information. In addition to these three layers, the central controller 110 also includes an optimizing search server and a management council.

The initial components of the central controller 110 may include a load balancing server 210 and a switch 215. The load balancing server 210 distributes web hits over the architecture of the central controller 110 via the switch 215. In other words, the load balancing server 210 monitors the architecture to determine what components are relatively busy and directs traffic away from those components.

The central controller 110 also includes a presentation server farm 220. The presentation server farm 220 contains the servers that provide the functionality associated with the first and second layers of the architecture namely, the logically presentation layer and the application layer. Specifically, the presentation server farm 220 includes logical presentation servers 222 that are programmed to provide the GUI resident on the web page accessed by the consumers 130. Also part of the presentation server farm 220 are the application servers 224. The application servers 224 provide the support and logic for the GUI created by the logical presentation servers 222. As noted above, the application servers 224 also provide the business rules that govern the operation of the central controller 110.

In one embodiment of the present invention, the presentation server farm 220 also includes hot swap servers 230, 235 for both the logical presentation servers 222 and application servers 224. Such hot swap servers provide redundancy and allow for continued availability in the event of a component failure.

Related to the presentation server form 220 is the presentation staging server 230. The presentation staging server 230 provides temporary functionality of the presentation server farm 220 during the period the presentation server farm 220 (and/or the software residing on the servers) is being upgraded. The presentation staging server 230 allows the migration of the logical presentation and application layers software.

The architecture of the central controller 110 also includes a database server farm 240, which provides the functionality for the database layer. Specifically, the database server farm 240 includes consumer database 242, magazine database 244, publisher database 246, and fulfillment house database 248. In the present embodiment each database is accessed, by a separate server, although in an alternate embodiment, more than one database may be accessed by the same server. The fields of each database and the purpose of each will be discussed in greater detail below.

Like the presentation server farm 220, the database server farm 240 includes a series of hot swap and staging servers 250, 252, 254, 256, one for each of the databases.

The central controller 110 also includes a search server 260 and corresponding hot swap server 262. The search server 260 is coupled to the database server farm 240 to optimize the search capability of the central controller 110. More specifically, the presentation server farm 220 controls the search server 260, which in turn, locally stores the databases 242, 244, 246, 248, as needed to perform searches. Like the other hot swap servers, the search hot swap server 262 provides redundancy should the search server 260 fail.

The central controller 110 also includes a management console 270 for monitoring the architecture. The management console 270, which in one embodiment takes the form of one or more NT workstations, monitors architecture performance, component loads, and overall network load. The management console 270 also performs the function of failure detection.

The central controller 110 also includes 3 gateways or links: a business to business and database maintenance gateway 280, a fulfillment and merchant processing gateway 282, and a business administration and customer service gateway 284. As will become apparent to those skilled in the art based upon the following description, these gateways are communication links to other devices.

A business to business and database maintenance gateway 280 is a link to the fulfillment houses 140. In the present preferred embodiment, this. gateway 280 is in the form of a wide area network (WAN), although in alternate embodiments may take the form of any network or other communication link. In the simplest embodiment, the business to business and database maintenance gateway 280 is not an electronic communication link, but rather a terminal through which the necessary information is entered. As described below, a business to business and database gateway 280 provides communication with the fulfillment houses 140 for the purposes of receiving information from the fulfillment houses 140 and transmitting subscription information to the fulfillment houses 140.

The fulfillment and merchant processing gateway 282 is also coupled to the database server farm 240. This gateway 282 provides communication to an enterprise server 286. More specifically, a central controller 110 communicates via the fulfillment and merchant processing gateway 282 with the enterprise server 286 for the purpose of fulfilling orders. It is to be understood that the enterprise server 286 is not limited to any particular server, but rather may take the form of any commercially available server.

The central controller 110 also includes the business administration and customer service gateway 284. Coupled to the presentation server farm 220, this gateway 284 provides a link to customer service and data management. More specifically, the business administration and customer service gateway 284 is linked to customer service employees who receive customer inquiries, either by way of the website, e-mail, or telephone and have access to the website and consumer accounts via the business administration and service gateway 284 and presentation server farm 220. In the present preferred embodiment, the consumer service employees have terminals coupled in the form of password-protected access to the website.

Figure 3:
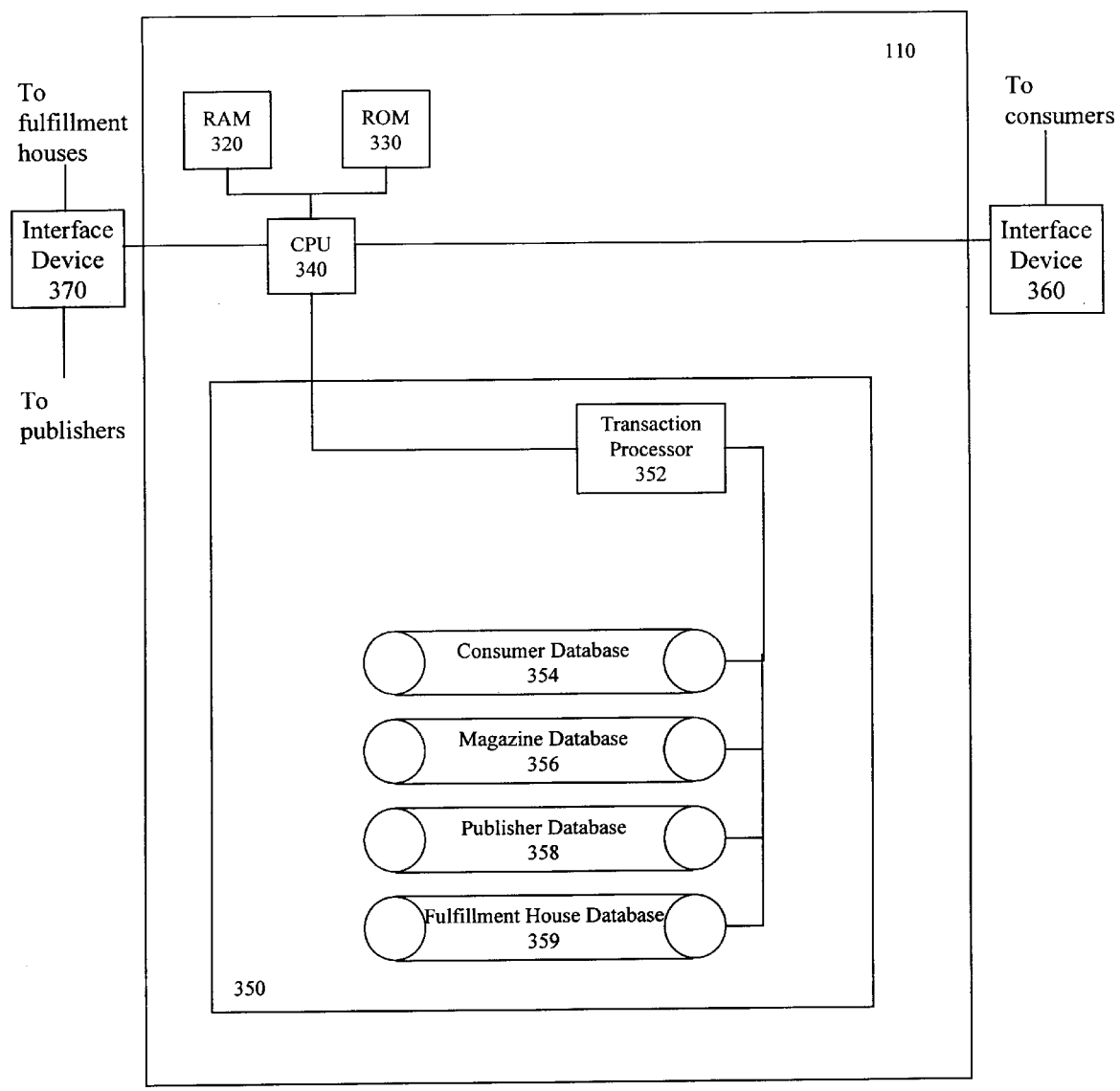
FIG. 3 illustrates another embodiment of the central controller used in the system shown in FIG. 1.

FIG. 3 illustrates an alternate embodiment of the central controller 110 for a system according to the present invention. As shown in FIG. 3, central controller 110 includes central processing unit (CPU) 340, random access memory (RAM) 320, read-only memory (ROM) 330, interface devices 360 and 370, and large capacity storage device 350. CPU 340, preferably comprising a conventional microprocessor such as an Intel Pentium Processor, is electronically coupled to each of the central controller 110's other elements.

CPU 340 executes program code stored in one or more of RAM 320, ROM 330 and storage device 350 to carry out the functions and acts described in connection with central controller 110. CPU 340 preferably comprises at least one high-speed digital data processor adequate to execute program modules for transmission of the universal questionnaire to determine trade publication subscriptions, renewals and cancellations. These modules are described in connection with FIGS. 8–13B. CPU 340 interacts with RAM 320, ROM 330 and storage device 350 to execute stored program code according to conventional data processing techniques.

Interface devices 360 and 370 comprise devices for allowing central controller 110 to communicate with consumers 125, fulfillment houses 140 and publishers 150. Such communication is preferably electronic by means of the internet and preferably comprises a conventional high speed modem employing known communication protocols capable of decrypting encrypted data received from the remote consumer terminals 120. In an alternate embodiment, central controller 110 includes separate interface devices for the fulfillment houses 140 and publishers 150.

Large capacity storage device 350 contains transaction processor 352, consumer database 354, magazine database 356, publisher database 358, and fulfillment house database 359. Transaction processor 352 maintains, determines and accesses data stored in the databases and prepares consumer information for transmission to publishers 150 and fulfillment houses 140 as described in connection with FIGS. 8–13B. Transaction processor 352 may comprise a separate, conventional CPU/microprocessor, or a portion of the operating function of CPU 340. Consumer database 354 contains data about consumers 125 and which trade publications fit their profile based on answers to the universal questionnaire. Magazine database 356 contains information about each trade publication, including its publisher and fulfillment house. Publisher database 358 contains information relating to trade publication publishers, including which trade publications each publishes. Fulfillment house database 359 contains information relating to each fulfillment house, including which trade publications are distributed by each fulfillment house. Samples of the respective fields contained in databases 354, 356, 358 and 359 are shown in and described in connection with FIGS. 4–7.

Database Formats

Samples of the contents of databases 354, 356, 358 and 359 are shown in FIGS. 4–7. The specific data and fields illustrated in these figures represent only one embodiment of the records stored in the databases of the invention. In most cases, the fields shown in FIGS. 4–7 are relatively straight forward and self-explanatory. It is to be understood that the data and fields, as well as the number of databases, can be readily modified from the described embodiment and adapted to provide variations for supplying free trade publication subscriptions and gathering consumer information. Furthermore, each field may contain more or less information. For example, an address field may be divided into separate fields containing street address, apartment number, city, state and zip code.

Consumer database 354 maintains (among other information) a compilation of all information provided by each consumer 125 in response to the universal questionnaire. Each record in consumer database 354 corresponds to one consumer. FIG. 4 illustrates a sample record. As shown in FIG. 4, consumer database 354 contains fields corresponding to, for example, consumer ID, consumer name, consumer address and e-mail address, consumer profession, consumer title, consumer field of specialty, qualification date, magazine ID and personal identifier. The fields whose data is retrieved directly from consumers answers to the universal questionnaire include the consumer name, consumer address and e-mail address, consumer profession, consumer title, field of specialty, qualification date and personal identifier. The qualification date is the date a consumer last completed the questionnaire and qualified for at least one subscription. The personal identifier provided by consumer 125 is any information known to consumer 125 but not known to the general public. The central controller 110 uses the personal identifier to verify that the consumer providing information is in fact the same consumer who initially responded to the questionnaire. From this data and data stored in other databases, the data for the remaining fields can be calculated.

Magazine database 356 contains information about trade publications offered to consumers. FIG. 5 illustrates a sample record of magazine database 356. As shown in FIG. 5, magazine database 356 contains trade publication information having fields corresponding to magazine ID, magazine name, publisher ID, fulfillment house ID, internal counter, internal counter limit and publisher charge (both new subscription and renewal).

The internal counter field is provided in the present embodiment because, in some instances, publishers may wish to limit the number of subscriptions for a particular trade publication. Thus, the internal counter field keeps track of the actual count of subscriptions supplied, while the internal counter limit field provide the limit of "saturation point" for that trade publication, as provided by publisher 150. In one embodiment, the central controller 110 monitors the internal counter field and the internal counter limit field, and notifies either the publisher 150 or the fulfillment house 140 when a trade publication is nearing its limit. This allows the publisher 150 or fulfillment house 140 to approve the present limit, or authorize an increase in that limit before it is actually met (and the trade publication is no longer offered).

In one embodiment, the counter will be implemented by transaction processor 352. In an alternate embodiment, the counter will be embedded in the logic of the universal questionnaire.

The publisher charge fields identify the fee the publisher 150 will be charged for a new subscription or a renewal for that particular trade publication. These charges vary for each trade publication, and are determined by the central controller 110 based on information specific to that publisher 150 and the trade publication. The publisher charge varies by trade publication title and in the present embodiment, parallels what is estimated to be the publisher's internal marginal acquisition cost. For instance, in one embodiment, the charge will be an amount equal to assumed acquisition costs for the particular trade publication, less a discount large enough to provide publisher 150 with an incentive to consent to the described method. The average charge is between $5 and $6 per acquired new subscription. Because the publisher's internal marginal acquisition cost for renewal subscriptions is generally less than the cost for a new subscription, the renewal charge is generally less than the charge for a new subscription. Thus, these charges provide an incentive for publishers to use the system of the present invention because it is less expensive than existing systems for subscription acquisition.

The fields of magazine database 356 containing data provided and periodically updated by magazine publishers (who have agreed to participate) include the magazine name, associated fulfillment house and subscription limit for the internal counter limit field. From this data and data stored in other databases, the data for the remaining fields can be calculated.

Publisher database 358 contains information about the trade publication publishers. FIG. 6 illustrates a sample record of publisher database 358. As shown in FIG. 6, publisher database 358 contains publisher records having fields corresponding to, for example, publisher ID, publisher name, publisher contact information and list of magazine ID's published. Like the data in magazine database 356, data in publisher database 358 is also provided and periodically updated by publishers 150.

Finally, fulfillment house database 359 contains information about trade publication fulfillment houses 140. FIG. 7 illustrates a sample record of fulfillment house database 359. As shown in FIG. 7, each record of fulfillment house database 359 corresponds to a particular fulfillment house 140 and has fields corresponding to, for example, fulfillment house ID, fulfillment house name, fulfillment house contact information and list of magazine ID's provided. Like the data in magazine database 356 and publisher database 358, data in fulfillment house database 359 is also provided and periodically updated by publishers 150 and fulfillment houses 140.

The process of using data from consumer database 354, magazine database 356, publisher database 358 and fulfillment house database 359 to determine and provide free trade publication subscriptions to consumers 125 is represented in the flow chart of FIG. 8, described in detail below. Central controller 110 uses consumer database 354, magazine database 356, publisher database 358 and fulfillment house database 359 to determine appropriate subscription information for each consumer 125 and to notify the appropriate fulfillment houses to either begin, renew or cancel a subscription to a trade publication for each consumer 125.

Subscription Process

The subscription process involves a series of steps through which the system establishes data stored in consumer database 354. As shown in FIG. 8, the first step comprises advertising to consumers 125 the availability of free trade publications (step 810). Such advertising can be provided in a number of ways, but the key aspect is introducing and providing the universal questionnaire to a wide variety of consumers.

First, the free trade publication promotion may be advertised on credit card statements. Most consumers who are professionals use credit cards, and therefore may qualify for trade publications. Also, the promotion may be advertised in frequent flyer statements, another good source because recipients are generally professionals, and many are business travelers. In addition to physical statements, the promotion may also be included as part of the credit card or airline website. Consumers who are attracted to the site will see a message that says: "If you are a professional, you probably qualify for one or more FREE publications about your business. Just answer a few questions to see what business publications you can enjoy, FREE." In this manner, the consumer 125 may be linked directly to the website of central controller 110 from the credit card or airline website. Next, the promotion may be advertised in professional catalogs and as a website link for those catalogs on-line. Again, such catalogs include readers focused in particular industries that are relevant for many trade publications. Finally, the promotion may be advertised on internet and intranet sites (in addition to those previously mentioned) that provide advertising and, depending on the website, are targeted towards professionals. The site provides an easy link to the website of the present invention (and central controller 110). In an alternate embodiment, the site provides a 1-800 number for a potential subscriber to call and contact central controller 110 directly.

Once consumers 125 have come into contact with the website provided by central controller 110, the central controller 110 transmits the universal questionnaire, receives certain consumer information in response to the universal questionnaire and determines the appropriate free trade publication subscription(s) the consumer 125 may receive (step 820). The universal questionnaire transmitted in step 820 is described in greater detail below, with reference to FIGS. 9, 10 and 11A–C.

Upon completion of the universal questionnaire, the central controller 110 determines the appropriate trade publications that apply to consumer 125, and notifies consumer 125 that he may receive any or all of them at no charge (step 830). As noted earlier, certain trade publications that consumer 125 qualifies for may not be offered if the internal counter field of magazine database 356 is above the limit specified in the internal counter limit field of magazine database 356. The central controller 110 compares the value in the internal counter field with the value in the internal counter limit field to determine if the trade publication is available.

The consumer 125 can choose all the trade publications available to him, a few of them, or none at all (step 840). In one embodiment, the central controller 110 is programmed to supply the choices in a particular way. For instance, the trade publications that generate the highest fee from a publisher 150 are offered in a more prominent way. Once the central controller 110 determines the trade publication list of offerings, the central controller 110 compares the value in the appropriate publisher charge field in the magazine database 356 corresponding to each offered trade publication. Then, the trade publication that provides the highest fee is offered first, at the top of the list, or on the first of several screens. In this embodiment, the trade publications are offered hierarchically based on the publisher charge.

Upon receipt of the consumer choices, central controller 110 updates the magazine ID field of consumer database 354 to reflect the trade publications consumer 125 will receive (step 850).

Next, central controller 110 generates an order for consumer 125 (based on the information in consumer database 354), and transmits the order to each appropriate fulfillment house 140 (step 860). The appropriate fulfillment houses are determined by reading the magazine ID from the consumer database 354, and cross-referencing that magazine ID or magazine IDs with the magazine IDs in magazine database 356 and fulfillment house database 359.

In addition to the order for each subscription, the appropriate fulfillment house 140 receives all consumer information obtained from the universal questionnaire and specific to the trade publication associated with that fulfillment house from central controller 110. Fulfillment house 140 stores the consumer information for the associated publisher 150 and in one embodiment, creates subscription file snapshot reports based on the consumer answers, and particularly the qualification date. Such reports may then be accessed for auditing.

In one embodiment, the fulfillment house 140 receives the order and consumer information electronically (i.e., via the internet). However, it is to be understood that the orders and consumer information may be received by any other means, such as telephone, facsimile or the postal service.

Central controller 110 also immediately notifies consumer 125 of the trade publications he will receive, along with any other pertinent information (step 860). In one embodiment, such notification is in the form of an e-mail, but it is to be understood that the notification may be received by any other means, such as telephone, facsimile or the postal service.

Finally, central controller 110 bills each publisher 150 for every new trade publication subscription provided (step 870). As described earlier, each magazine is allotted a publisher charge (new subscription), which is provided in magazine database 356.

Publisher 150 is notified and charged based on the information contained within consumer database 354, magazine database 356 and publisher database 358. Specifically, once central controller 110 determines the trade publications consumer 125 will receive and stores them by magazine ID in consumer database 354, central controller 110 determines the publisher charge and publisher ID. Finally, using the publisher ID, central controller 110 can determine the publisher contact information from publisher database 358 and bill publisher 150 accordingly.

In one embodiment, publisher 150 receives the bill (publisher charge) electronically, (i.e., via the internet). However, it is to be understood that the orders may be received by other means, such as telephone, facsimile or the postal service.

The determination of the appropriate trade publication subscriptions for each consumer 125 need not be real-time, but rather may be determined after consumer 125 has responded to the questionnaire. For example, in an alternate embodiment, a further field of the consumer database 354 is entitled "content codes". Such codes are generated by the universal questionnaire based on answers from the consumer. These content codes are then matched with similar codes provided for each trade publication in a content code field of the magazine database 356. The content codes stored in magazine database 356 are based on information received from publisher 150 about that particular trade publication, and translated into code by the central controller 110. The central controller 110 would matches the content codes between the consumer database 354 and the magazine database 356, and from this information determines which trade publications are offered to each consumer. This function would be a part of step 820.

The universal questionnaire will now be described in greater detail with reference to FIGS. 9, 10 and 11A–C.

First, the term "universal questionnaire" defines a generic questionnaire that can be shown to all consumers. The questions that make up the universal questionnaire are generated based on specific, targeted questionnaires received from each publisher 150 for each trade publication. Specifically, each publisher 150 provides the questionnaire originally sent to individual prospective subscribers (as discussed in the BACKGROUND OF THE INVENTION). Central controller 110 cannot simply pass on these questions to a consumer 125, as other publishers with similar questions, or trade publications covering the same industry, may have slightly different questions (and potential answers). Central controller 110 first stores all questionnaire information for each publication. Central controller 110 then merges similar questions, for instance from publishers for a given industry. While many of the questions for each industry may be similar (i.e., seeking the same type of information), the answers can vary both in the number of potential responses and the nature of the responses. Questions provided by a publisher that are unique to that publisher are not changed. However, the interchangeable questions and answers are modified between publishers and "normalized" into the universal questionnaire.

An example of the normalization process is shown in FIG. 9. A question retrieved from individual questionnaires generated by separate publishers for magazines A, B and C, is shown. Also shown are answers specific to each individual questionnaire for each magazine. In one embodiment, central controller 110 determines that the particular question associated with each magazine (and shown in FIG. 9) is similar, and merges (or normalizes) that set of questions into one question ("What is your organization's annual gross sales?"). This normalized question becomes part of the universal questionnaire. Also, the question from the individual questionnaires of magazines A, B and C has unique answers for each magazine. Again, the central controller 110 merges (or normalizes) that group of answers into one set of answers that match the normalized question. When consumers 125 respond to the universal questionnaire, their answers are stored in consumer database 354 in a normalized fashion. However, in one embodiment, consumer information supplied to fulfillment house 140 from consumer database 354 is de-normalized, based on the trade publication/publisher questionnaires.

In an alternate embodiment, the consumer information supplied to fulfillment house 140 from consumer database 354 remains normalized.

Figure 8:
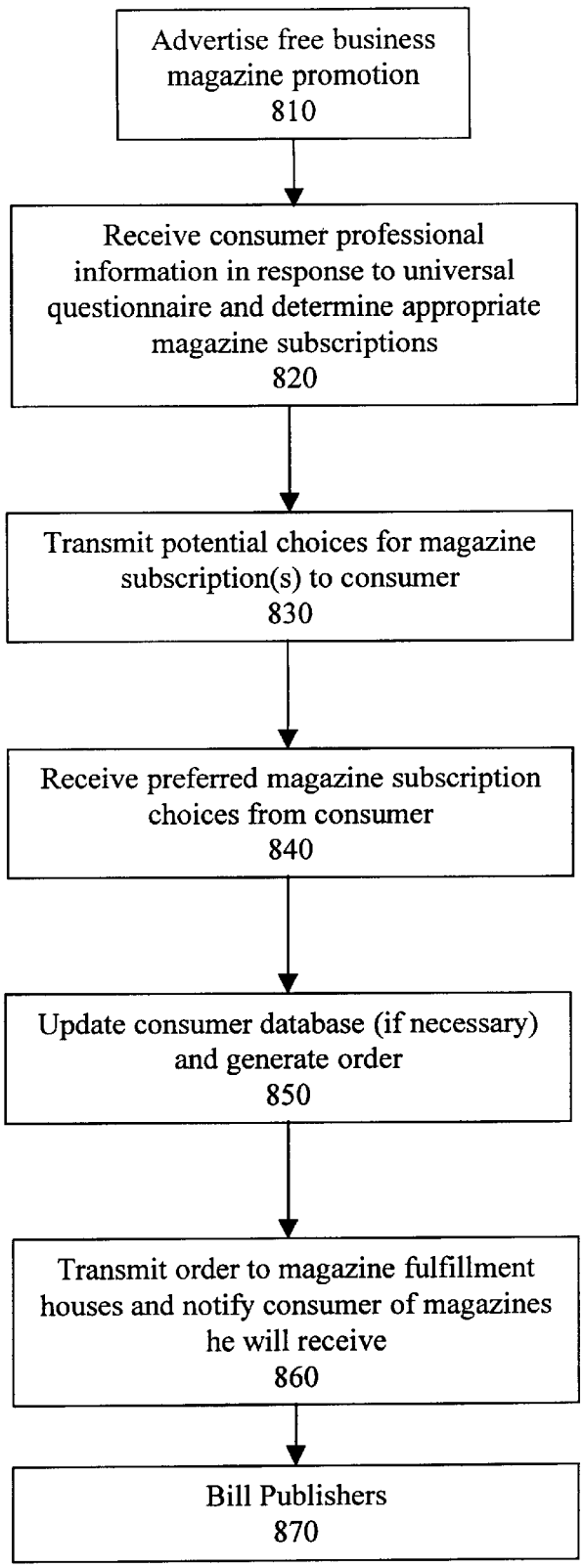
FIG. 8 illustrates a new subscription process executed by the system shown in FIG. 1.
Figure 10:
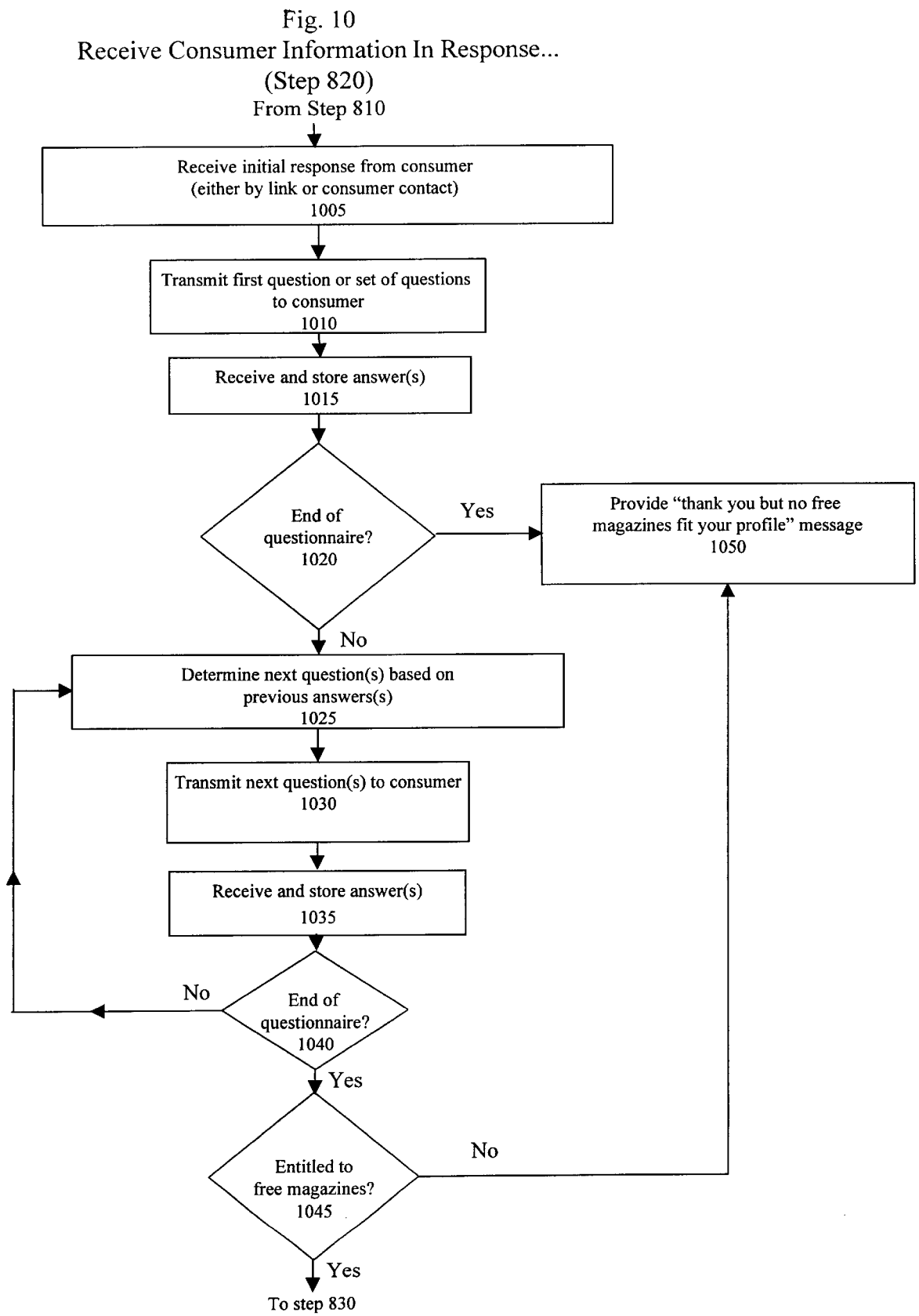
FIG. 10 illustrates a portion of the new subscription process illustrated in FIG. 8.

FIG. 10 displays the sub-steps of step 820 (FIG. 8). As shown therein, upon receipt of initial consumer interest (step 1005), a first question or set of questions is provided to consumer 125 (step 1010). Questions of the universal questionnaire are generated based on a complex set of algorithms and artificial intelligence. One example is a "virtual form" based on "if-then" logic which focuses certain trade publications to a consumer based on the answers provided.

In one embodiment of the system implementing the questionnaire, the first question is "Are you a business professional?" If consumer 125 answers "No," the central controller ends the questionnaire and notifies the consumer that he is not entitled to any trade publications at this time.

In another embodiment, the central controller 110 transmits an initial set of screening questions to identify the publications for which consumer 125 most likely will qualify. More specifically, in one embodiment, the screening questions identify the consumer's industry and occupation. The central controller 110 transmits such screening questions and receives consumer information in response to the screening questions. For example, the first screening question may be "What is your industry?", to which consumer 125 may respond "Direct Mail". The next question may be "What is you field within that industry?", to which consumer 125 may respond "Information Technology" or "Marketing".

Based on consumer 125's responses, central controller 110 determines the appropriate trade publications for which consumer 125 may potentially qualify. In one embodiment, the magazines are pre-coded according to the screening questions (e.g., industry and occupation), and codes are associated with each magazine's entry in magazine database 356. Determining the potential free publications involves matching the consumer 125's responses to these codes. Based on this matching, the central controller 110 then transmits the list of potential trade publications and allows consumer 125 to select those publications he is interested in obtaining. In one embodiment, central controller 110 asks consumer 125 to identify which of the potential publications he is not interested in. After receiving the initial consumer choices, the central controller 110 proceeds with the remainder of the questionnaire, with the remaining questions based on the trade publications chosen by consumer 125. In alternate embodiments, central controller 110 generates the remainder of the questionnaire based on the initial consumer selections in real-time or the central controller 110 retrieves a previously generated and stored questionnaire.

In one embodiment (described by FIG. 10), the central controller 110 transmits a question or set of questions (step 1010), and receives and stores answers from the consumer 125 (step 1015) in the consumer database 354. After each question or set of questions, central controller 110 checks to determine, based on the information provided by consumer 125, if the questionnaire is complete and if consumer 125 is entitled to any trade publications at that time. For instance, after receiving and storing answers to the first set of questions, central controller 110 may determine that no further answers are required from consumer 125. If so, central controller 110 notifies consumer 125 with an appropriate message (step 1050). However, if the questionnaire is not complete, central controller 110 determines an additional question or questions based on the answers already received from consumer 125 (step 1025), and transmits this question or set of questions to consumer 125 (step 1030). Again, central controller 110 receives and stores the answers in consumer database 354 (step 1035), and once again determines if the questionnaire is complete (step 1040). Upon completion of the questionnaire, central controller 110 either determines that the consumer 125 is entitled to free trade publications, or again, determines otherwise and notifies the consumer 125 of such (step 1050).

Figure 11B:
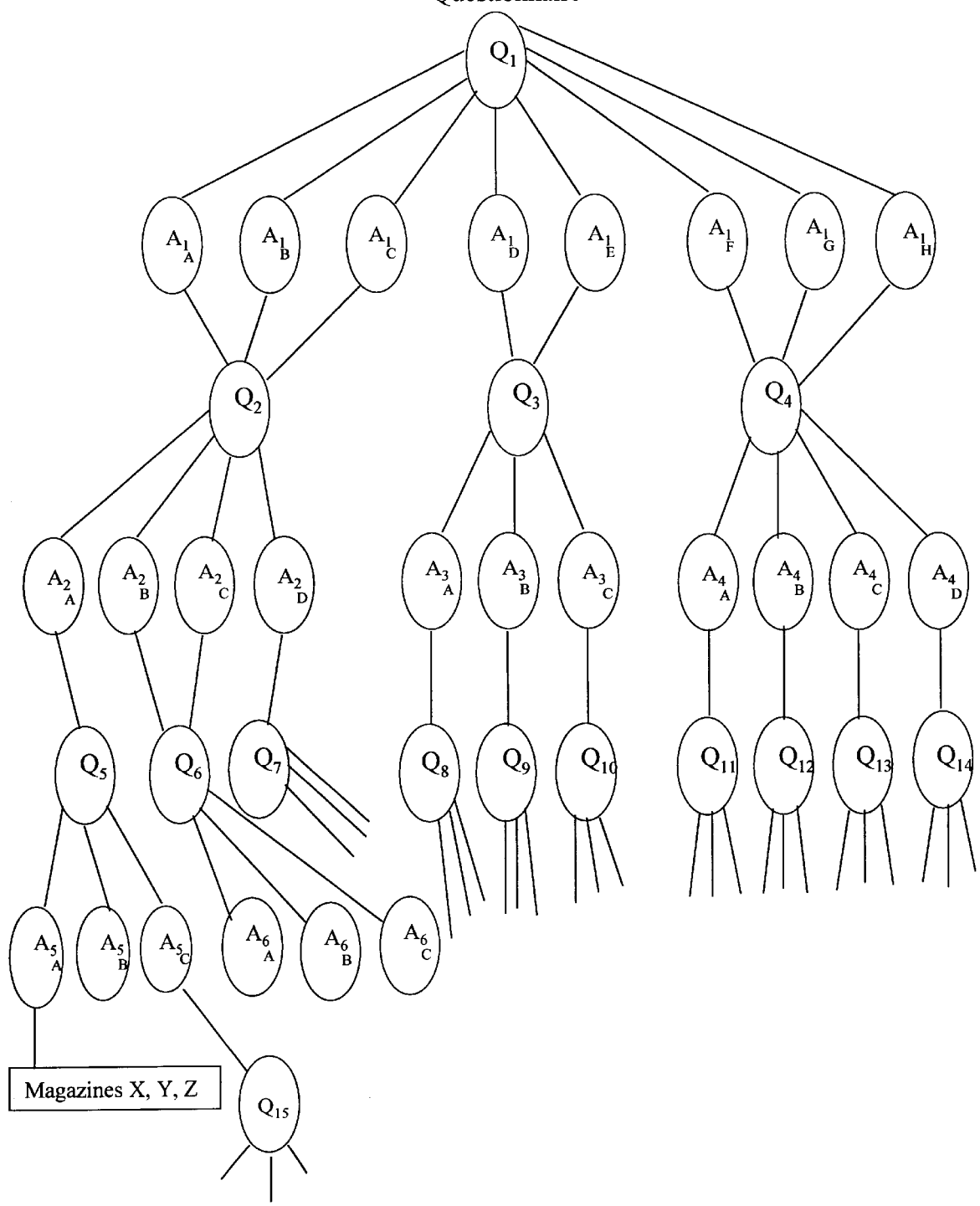
FIG. 11B illustrates the "Tree Logic" of the "Universal Questionnaire" that is part of the system shown in FIG. 1.

FIGS. 11A–C illustrate different logical representatives of the same universal questionnaire. FIG. 11A displays a specific example of step 820 (FIG. 8). For instance, after determining that consumer 125 is an "Engineer" (steps 1115, 1120), each question or set of questions transmitted to the consumer 125 by the central controller 110 becomes more and more focused, until ultimately determining that the consumer is entitled to "Magazines X, Y, and Z" (step 1145).

FIG. 11B displays the logic of the universal questionnaire, particularly how the determination of each question is based on the previous answer received from a consumer 125. Also, FIG. 11B shows that several answers may generate the same follow-up question.

Finally, FIG. 11C display one format that may appear to a consumer 125 at a remote user-terminal 120. In FIG. 11C, the answer selected to question 1(Q1) is "Engineer" (A1). Based on this answer (A1), central controller 110 determines that question 2 ($Q_2$) is provided next to consumer 125. This logical process continues until central controller 110 determines if consumer 125 qualifies for any trade publications.

In one embodiment, shown in FIG. 11C, the consumer 125 is offered a set of possible answers to choose from. In another embodiment, the consumer may simply type in or speak his answers without the need for a group of choices, and the central controller 110 determines the next question or set of questions based on each specialized answer.

Re-Qualification Process

Figure 12A:
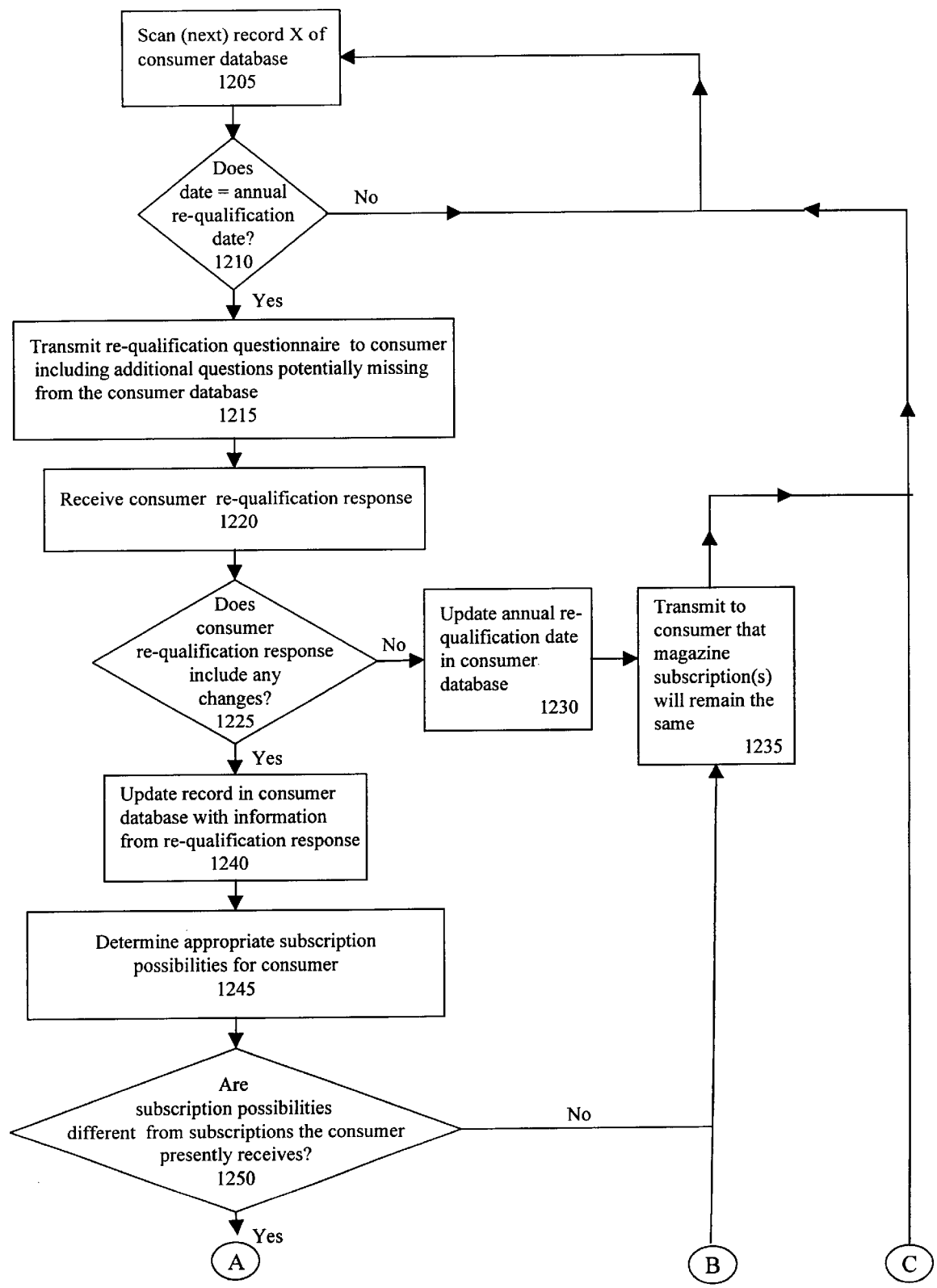
FIGS. 12A–B illustrate an annual re-qualification process executed by the system shown in FIG. 1.
Figure 12B:
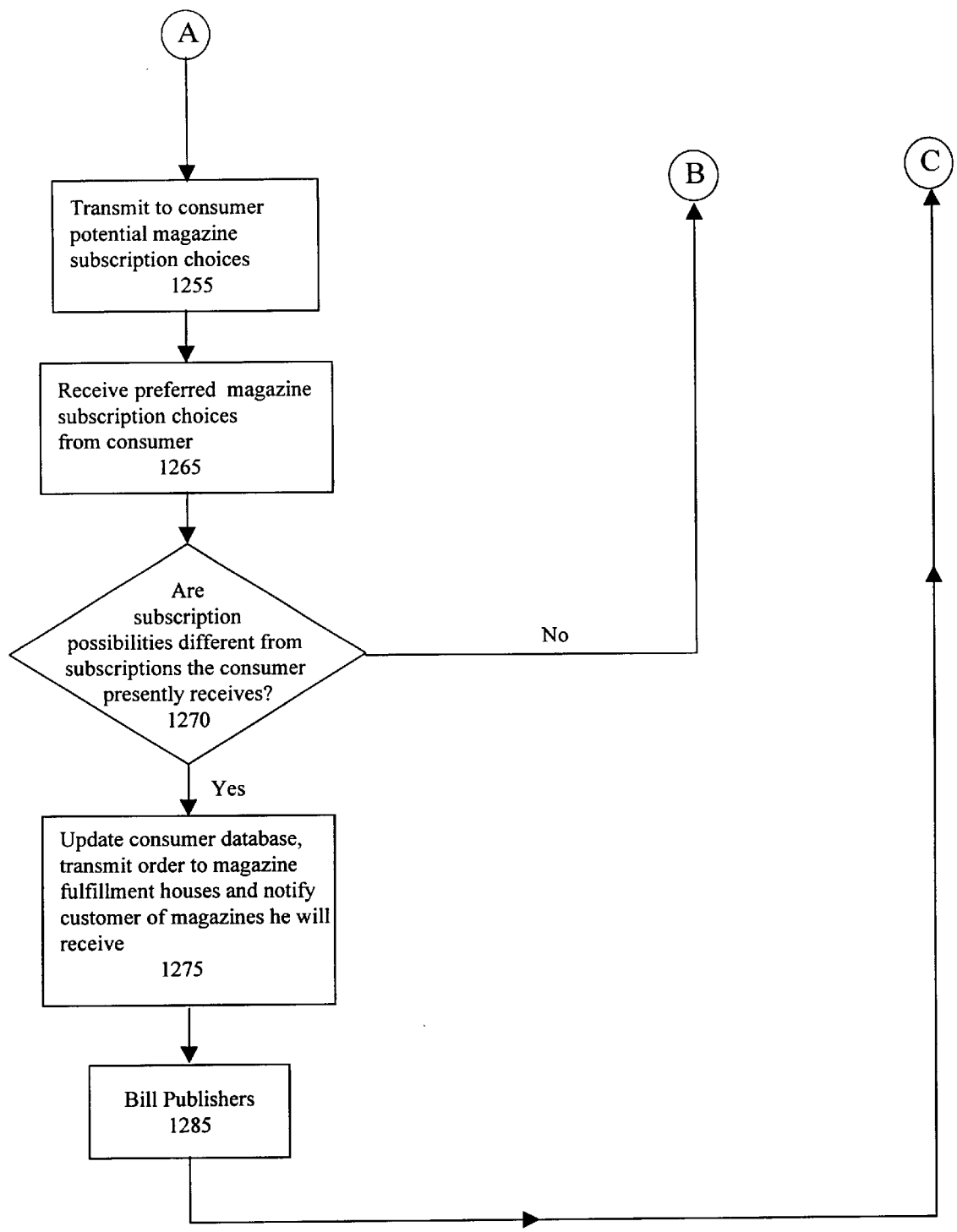

The re-qualification process involves a series of steps demonstrated by FIGS. 12–13. First, central controller 110, and particularly transaction processor 352, scans the "qualification date" field of consumer database 354 (step 1205) to determine if the present date coincides with the original qualification date plus an arbitrary number, generally less than one year for annual renewals (step 1210). For instance, if consumer 125 qualifies for a subscription on Jul. 11, 1999, his re-qualification date may be Jun. 11, 2000 (i.e., one month before the annual subscription expires). On that date, the central controller 110 starts the re-qualification process. The central controller 110 will continually check all "qualification dates" for all entries in the consumer database 354 to determine if the re-qualification process should be initiated.

In one embodiment, consumer 125 is contacted electronically (i.e., via e-mail) and notified that one or more trade publication subscriptions will expire soon, and further information may be necessary to renew the subscription, or possibly replace or add additional subscriptions (based on new information received). In other embodiments, consumer 125 may be contacted by telephone or through the mail.

First, central controller 110 can request that consumer 125 provide their personal identifier, previously supplied by consumer 125 and stored in consumer database 354, to verify that the appropriate individual is providing updated information.

Next, a re-qualification questionnaire is transmitted to consumer 125 in the same fashion as described with reference to FIG. 8 (step 1215). However, the questions provided to consumer 125 are attempting to determine if anything about the consumer 125 has changed since initial qualification (i.e., new occupation, different position within the same company, . . . ). Depending on the answers received (step 1220), consumer 125 may be entitled to the same trade publications, different trade publications, a combination of both or none at all. The central controller 110 is designed to review each answer or set of answers provided by consumer 125, and determine additional questions (if necessary) to update the consumer profile stored in consumer database 354 (step 1225). If consumer 125 reports no changes, his qualification date will be updated in consumer database 354 (step 1230) and consumer 125 will be notified that his trade publication subscription(s) will remain the same (step 1235). Also, each fulfillment house 140 will be notified of the trade publication subscription renewal, and each publisher 150 will be charged the renewal charge as stored in magazine database 356. However, the renewal charge will in most instances be proportionately less than the charge for a new subscription. For instance, in one embodiment the renewal charge is approximately $1.25 annually for all trade publications.

If consumer 125 reports any changes in response to the universal questionnaire, central controller 110 first updates the consumer database 354 to reflect those changes (step 1240). Such changes may be minor, such as a new telephone number or e-mail address, which would not affect the consumer profile (step 1245). Thus, trade publication subscriptions would be renewed, fulfillment house(s) notified and publisher(s) charged. In addition, consumer 125 would be notified that his trade publication subscriptions would remain the same (step 1235).

However, if consumer 125 supplies information that substantially changes his profile (as determined by central controller 110), such as a new position in a different industry, central controller 110 may determine that consumer 125 is entitled to different trade publications than what consumer 125 presently receives (step 1250). Central controller 110 then transmits to consumer 125 a choice of trade publication titles based on his most recent answers to the re-qualification questionnaire (step 1255). Some or all of these choices may simply be renewal offers for trade publications consumer 125 already receives. Upon receipt of consumer 125's selections (step 1265), central controller 110 compares consumer 125's selections with the previous profile, to determine if any new trade publications have been selected (step 1270). If only renewal subscriptions have been selected, central controller 110 will execute the standard function for renewal (notify fulfillment house(s), charge publisher(s) and notify consumer). However, if consumer 125 does select new titles, central controller 110 updates consumer database 354 based on the new selections, and transmits such information to fulfillment house 140 exactly as described earlier for a new subscription (step 1275). Finally, publisher 150 is charged the full fee for a new subscription, and the renewal fee for any renewals.

Figure 13A:
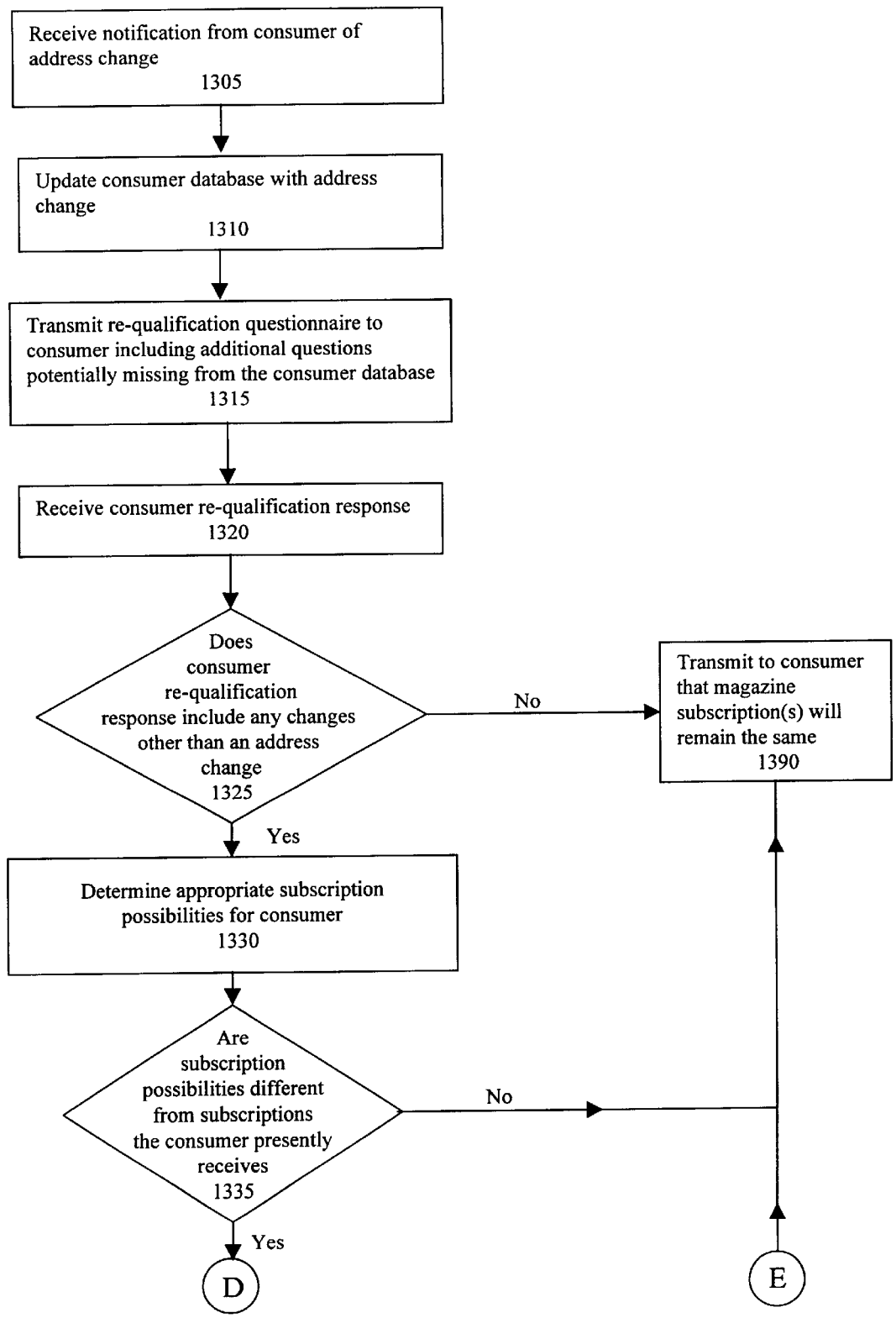
FIGS. 13A–B illustrate an address change re-qualification process executed by the system shown in FIG. 1.
Figure 13B:
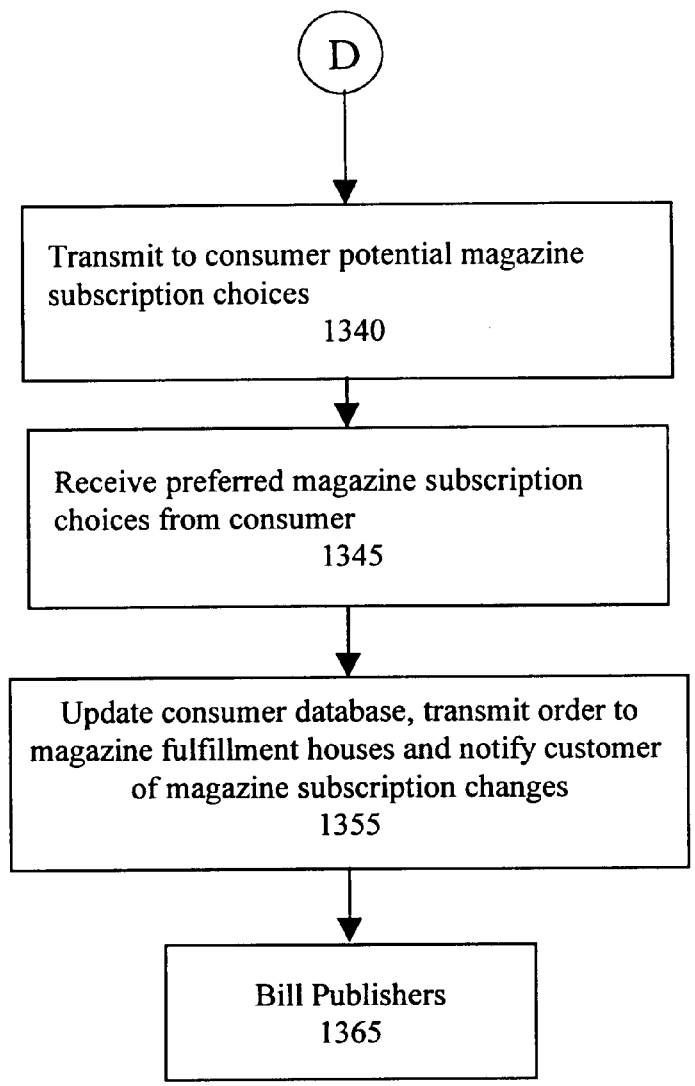

The re-qualification process also begins upon receipt from consumer 125 of an address change, as demonstrated by FIGS. 13A–B. In one embodiment, consumer 125 notifies central controller 110 of such a change by sending in a postcard (provided with each trade publication). In other embodiments, consumer 125 may notify central controller by e-mail or telephone (step 1305). Central controller 110 immediately updates consumer database 354 with the address change (step 1310), and transmits to consumer 125 a re-qualification questionnaire (step 1315). The questions provided to consumer 125 are attempting to determine if consumer 125's only profile change is the mailing address, or if other information, such as consumer occupation, has changed. Based on consumer 125's response to the questionnaire (step 1320), central controller 110 determines if anything beyond the mailing address, e-mail address, or other non-substantive information has changed (step 1325). If there are no substantive changes, central controller 110 notifies consumer 125 that all trade publications will remain the same (step 1390).

However, if information deemed substantive by central controller 110 has changed, such as a new position in a different industry, central controller 110 may determine that consumer 125 is entitled to different trade publications than what consumer 125 presently receives (steps 1330, 1335). If some or all of the titles are the same as what consumer 125 already receives, and the renewal re-qualification date has not yet been reached, central controller 110 notifies consumer 125 that he will continue to receive those publications (step 1390). Central controller 110 may also transmit to consumer 125 a choice of new trade publication titles based on his most recent answers to the re-qualification questionnaire (step 1340). For titles provided to consumer 125 that are new and selected by consumer 125 (step 1345), central controller 125 updates consumer database 354 based on the new selections, and transmit such information to fulfillment house 140, exactly as described earlier for a new subscription (step 1355). Also, publisher 150 is charged the full fee for a new subscription (step 1365).

Conclusion

The system of the invention provides an efficient process for targeting and securing trade publication subscribers based on a universal questionnaire, and provides free trade publication subscriptions to consumers. Use of the universal questionnaire eliminates the drawbacks associated with individual questionnaires sent by each publisher to potential subscribers.

It will be apparent to those skilled in the art that various modifications and variations can be made in the system and processes of the present invention without departing from the spirit or scope of the invention. Thus, it is intended that the present invention cover the modifications and variations of this invention provided they come within the scope of the appended claims and their equivalents. In this context, equivalents means each and every implementation for carrying out the functions recited in the claims, even if not explicitly described herein.

What is claimed is:

1. A method of providing free subscriptions to trade publications, comprising:

transmitting one or more questions selected from a first universal questionnaire to a consumer, said first universal questionnaire including questions applicable to a plurality of free trade publications;

receiving consumer information in response to said questions;

determining a supplier order for one or more of said free trade publications based upon said consumer information;

selectively transmitting one or more questions selected from a second questionnaire to said consumer;

receiving second consumer information in response to said one or more questions selected from said second questionnaire; and generating a supplier order for one or more free subscriptions to said free trade publications based on said second consumer information.

2. The method of claim 1, further comprising:

periodically checking a re-qualification date for said consumer information, wherein selectively transmitting one or more questions selected from a second questionnaire to said consumer is based upon said re-qualification date.

3. The method of claim 2, wherein the first universal questionnaire and the second questionnaire are different.

4. The method of claim 1, further comprising:

receiving a change to said consumer information, wherein selectively transmitting one or more questions selected from a second questionnaire to said consumer is based upon said change.

5. The method of claim 4, wherein the first universal questionnaire and the second questionnaire are different, .

6. The method of claim 1 further comprising, storing in a first database consumer information received in response to said first universal questionnaire;

storing in a second database trade publication supplier information;

receiving new consumer information from said consumer;

storing said new consumer information in said first database;

comparing said new consumer information in said first database with said trade publication supplier information in said second database; and generating an updated supplier order for one or more free subscriptions to trade publications based upon said comparison.

7. The method of claim 1, wherein the questions selected from said second questionnaire are based on said consumer information.

8. A system for providing free subscriptions to trade publications, comprising:

means for transmitting one or more questions selected from a first universal questionnaire to a consumer, said first universal questionnaire including questions applicable to a plurality of free trade publications;

means for receiving consumer information in response to said questions;

means for determining a supplier order for one or more of said free trade publications based upon said consumer information;

means for selectively transmitting one or more questions selected from a second questionnaire to said consumer;

means for receiving second consumer information in response to said one or more questions selected from said second questionnaire; and means for generating a supplier order for one or more free subscriptions to said free trade publications based on said second consumer information.

9. The system of claim 8, further comprising:

means for periodically checking a re-qualification date for said consumer information, wherein said means for selectively transmitting one or more questions selected from a second questionnaire to said consumer is based upon said re-qualification date.

10. The system of claim 9, wherein the first universal questionnaire and the second questionnaire are different.

11. The system of claim 8, further comprising:

means for receiving a change to said consumer information, wherein said means for transmitting one or more questions selected from a second questionnaire to said consumer is based upon said change.

12. The system of 11, wherein the first universal questionnaire and the second questionnaire are different.

13. The system of claim 8, further comprising:

a first database storing consumer information received in response to said first universal questionnaire;

a second database storing trade publication supplier information;

means for receiving new consumer information from said consumer;

means for storing said new consumer information in said first database; and means for comparing said new consumer information in said first database with said trade publication supplier information in said second database and for generating an updated supplier order for one or more free subscriptions to trade publications base upon comparison.

14. The system of claim 8, wherein the questions selected from said second questionnaire are based on said consumer information.

15. A method of providing free subscriptions to trade publications, comprising:

presenting screening questions to a consumer;

receiving consumer answers in response to said screening questions;

generating a list of trade publications based upon said consumer answers;

transmitting said list to said consumer, receiving a consumer selection from said list of trade publications;

transmitting one or more questions selected from a universal questionnaire to said consumer based on said consumer selection, said universal questionnaire including questions applicable to a plurality of trade publications;

receiving consumer information in response to said questions selected from the universal questionnaire;

generating a supplier order for one or more free subscriptions to trade publications based upon said consumer information; and transmitting said supplier order to one or more respective suppliers of said trade publications.

16. A method of providing free subscriptions to trade publications, comprising:

receiving a first question from a first publisher;

receiving a second questionnaire from a second publisher;

creating a universal questionnaire by normalizing said first and second questionnaires, said universal questionnaire including questions applicable to a plurality of trade publications;

presenting to a consumer questions of said universal questionnaire;

receiving consumer information from said consumer in response to said universal questionnaire; and providing at least one free trade publication subscription based said consumer information.

17. A system for providing free subscriptions to trade publications, comprising:

one or more controllers which transmit one or more questions selected from a first universal questionnaire to a consumer, said universal questionnaire including question applicable to a plurality of trade publications; receive consumer information in response to said questions; determine a supplier order for one or more of said free trade publications based upon said consumer information; selectively transmit one or more questions selected from a second questionnaire to said consumer;

receive second consumer information in response to said one or more questions selected from said second questionnaire; and generate a supplier order for one or more free subscriptions to said free trade publications based on said second consumer information.

18. A system for providing free subscriptions to trade publications, comprising:

means for presenting screening questions to a consumer;

means for receiving consumer answers in response to said screening questions;

means for generating a list of trade publications based upon said consumer answers, means for transmitting said list to said consumer;.

means for receiving a consumer selection from said list of trade publications;

means for transmitting one or more questions selected from a universal questionnaire to said consumer based on said consumer selection, said universal questionnaire including questions applicable to a plurality of trade publications;

means for receiving consumer information in response to said questions selected from the universal questionnaire;

means for generating a supplier order for one or more free subscriptions to trade publications based upon said consumer information; and means for transmitting said supplier order to one or more respective suppliers of said trade publications.

19. A system for providing free subscriptions to trade publications, comprising:

one or more controllers which present screening questions to a consumer; receive consumer answers in response to said screening questions; generate a list of trade publications based upon said consumer answers; transmit said list to said consumer; receive a consumer selection from said list of trade publications; transmit one or more questions selected from a universal questionnaire to said consumer based on said consumer selection, said universal questionnaire including questions applicable to a plurality of trade publications; receive consumer information in response to said questions selected from the universal questionnaire; generate a supplier order for one or more free subscriptions to trade publications based upon said consumer information; and transmit said supplier order to one or more respective suppliers of said trade publications.

20. A system for providing free subscriptions to trade publications, comprising:

means for receiving a first questionnaire from a first publisher, means for receiving a second questionnaire from a second publisher, means for creating a universal questionnaire by normalize said first and second questionnaires, said universal questionnaire including questions applicable to a plurality of trade publications;

means for presenting to a consumer questions of said universal questionnaire;

means for receiving consumer information from said consumer in response to said universal questionnaire; and means for providing at least one free trade publication subscription based said consumer information.

21. A system for providing fee subscriptions to trade publications, comprising:

one or more controllers which receive a first questionnaire from a first publisher; receive a second questionnaire from a second publisher, create a universal questionnaire by normalizing said first and second questionnaires, said universal questionnaire including questions applicable to a plurality of trade publications; present to a consumer questions of said universal questionnaire; receive consumer information from said consumer in response to said universal questionnaire and provide at least one free trade publication subscription based said consumer information.

22. A method of providing free subscriptions to trade publications, comprising:

presenting screening questions to a consumer;

receiving consumer answers in response to said screening questions;

generating a list of trade publications based upon said consumer answers;

transmitting said list to said consumer;

receiving a consumer selection from said list of trade publications;

transmitting one or more questions selected from a questionnaire to said consumer based on said consumer selections, wherein said questions selected from the questionnaire are applicable to a plurality of trade publications;

receiving consumer information in response to said questions selected from the questionnaire;

selecting, from the plurality of trade publications, one or more free trade publications to provide to the consumer, based on the customer information;

generating a supplier order for subscriptions for said one or more selected free trade publications; and transmitting said supplier order to one or more respective suppliers of said trade publications.

23. A system for providing free subscriptions to trade publications, comprising:

means for presenting screening questions to a consumer;

means for receiving consumer answers in response to said screening questions;

means for generating a list of trade publications based upon said consumer answers;

means for transmitting said list to said consumer;

means for receiving a consumer selection from said list of trade publications;

means for transmitting one or more questions selected from a questionnaire to said consumer based on said consumer selections, wherein said questions selected from the questionnaire are applicable to a plurality of trade publications;

means for receiving consumer information in response to said questions selected from the questionnaire;

means for selecting, from the plurality of trade publications, one or more free trade publications to provide to the consumer, based on the customer information;

means for generating a supplier order for subscriptions for said one or more selected free trade publications; and means for transmitting said supplier order to one or more respective suppliers of said trade publications.

24. A system for providing free subscriptions to trade publications, comprising:

one or more controllers which present screening questions to a consumer; receive consumer answers in response to said screening questions; generate a list of trade publications based upon said consumer answers; transmit said list to said consumer; receive a consumer selection from said list of trade publications; transmit one or more questions selected from a questionnaire to said consumer based on said consumer selections, wherein said questions selected from the questionnaire are applicable to a plurality of trade publications; receive consumer information in response to said questions selected from the questionnaire; select from the plurality of trade publications, one or more free trade publications to provide to the consumer, based on the customer information; generate a supplier order for subscriptions for said one or more selected free trade publications; and transmit said supplier order to one or more respective suppliers of said trade publications.

\* \* \* \* \*

UNITED STATES PATENT AND TRADEMARK OFFICE
CERTIFICATE OF CORRECTION

PATENT NO. : 6,421,652 B2
DATED : July 16, 2002
INVENTOR(S) : Michael Loeb et al.

It is certified that error appears in the above-identified patent and that said Letters Patent is hereby corrected as shown below:

Column 16,
Line 8, replace the phrase "claim 1 further comprising," with -- claim 1, further comprising: --.

Column 17,
Line 7, replace the phrase "based upon comparison." with -- based upon said comparison --.
Line 49, add the word -- upon -- after the word "based".
Line 56, replace the word "question" with -- questions --.

Column 18,
Line 51, replace the word "normalize" with -- normalizing --;
Line 61, add the word -- upon -- after the word "based".
Line 66, replace the punctuation mark "," with -- ; --.

Column 19,
Line 5, add the punctuation mark -- ; -- after the word "questionnaire".
Line 29, replace each occurrence of the word "customer" with the word -- "consumer --.

Column 20,
Line 13, replace each occurrence of the word "customer" with the word -- "consumer --.
Line 36, replace each occurrence of the word "customer" with the word -- consumer --.

Signed and Sealed this

Twenty-sixth Day of November, 2002

Attest:

Attesting Officer

JAMES E. ROGAN
Director of the United States Patent and Trademark Office